United States Patent

Hsu

(10) Patent No.: US 6,805,547 B2
(45) Date of Patent: Oct. 19, 2004

(54) MOLD ASSEMBLY FOR FORMING A WAX PATTERN IN THE SHAPE OF A GOLF CLUB HEAD

(75) Inventor: Wei-Huang Hsu, Taoyuan (TW)

(73) Assignee: Fu Sheng Industrial Co., Ltd., Taipei (TW)

( * ) Notice: Subject to any disclaimer, the term of this patent is extended or adjusted under 35 U.S.C. 154(b) by 140 days.

(21) Appl. No.: 10/335,914

(22) Filed: Jan. 3, 2003

(65) Prior Publication Data

US 2004/0131720 A1 Jul. 8, 2004

(51) Int. Cl.⁷ .............................................. B29C 33/00
(52) U.S. Cl. .............................. 425/468; 425/DIG. 10; 249/177
(58) Field of Search .............................. 425/438, 468, 425/DIG. 10; 249/177; 164/340, 341, 346

(56) References Cited

U.S. PATENT DOCUMENTS

| | | | | |
|---|---|---|---|---|
| 4,842,243 A | * | 6/1989 | Butler | 249/124 |
| 5,417,559 A | * | 5/1995 | Schmidt | 425/186 |
| 5,429,365 A | * | 7/1995 | McKeighen | 473/346 |
| 5,651,409 A | * | 7/1997 | Sheehan | 164/412 |
| 5,908,643 A | * | 6/1999 | Yost et al. | 425/186 |
| 6,406,654 B1 | * | 6/2002 | Perez et al. | 264/225 |

* cited by examiner

*Primary Examiner*—James P. Mackey
*Assistant Examiner*—Donald Heckenberg
(74) *Attorney, Agent, or Firm*—Bacon & Thomas PLLC

(57) ABSTRACT

A mold assembly for forming a wax pattern in the shape of a golf club head includes a plurality of outer molds coupled together to defined a cavity and an inclined tunnel therein, with a plurality mold cores received in the cavity and a supporting member received in the inclined tunnel, in order to form a wax pattern which has an opening formed in an inclined front face thereof. Furthermore, both the tunnel and a parting plane between the mold cores make such a compensatory angle with horizontal surfaces of the outer molds that the opening of the wax pattern may be delimited by a peripheral wall perpendicular to a front face of the wax pattern.

6 Claims, 5 Drawing Sheets

MOLD ASSEMBLY FOR FORMING A WAX PATTERN IN THE SHAPE OF A GOLF CLUB HEAD

BACKGROUND OF THE INVENTION

1. Field of the Invention

The present invention relates to a mold assembly for forming a wax pattern in the shape of a golf club head and, more particularly, to such a mold assembly in which a tunnel defined in outer molds of the mold assembly makes such a compensatory angle with horizontal surfaces of the outer molds that the wax pattern may have an opening delimited by a peripheral wall perpendicular to an inclined front face of the wax pattern.

2. Description of Related Art

A known mold assembly for forming a wax pattern in the shape of a golf club head is illustrated in FIGS. 1 to 3. The mold assembly includes a pair of outer molds 11 and 12 releasably coupled together to define a cavity 111 and 121 and a tunnel 112 and 122 therein, with a plurality of mold cores 21 and 22 received in the cavity 111 and 121 and a supporting member 30 received in the tunnel 112 and 122 to hold the mold cores 21 and 22 in the cavity 111 and 121. As soon as melted wax poured into the cavity 111 and 121 becomes cool, a wax pattern 40 in the shaped of a golf club head can be obtained for manufacturing a sequent golf club head afterwards.

In this conventional mold assembly, both the tunnel 112 and 122 and a parting plane 23 between the mold cores 21 and 22 are designed to be parallel to horizontal surfaces of the outer molds 11 and 12, so as to allow the mold cores 21 and 22 and the supporting member 30 to be pull out from the resulting wax pattern 40.

However, the wax pattern 40 has an opening 41 formed in an inclined front face which actually makes an acute angle θ with vertical surfaces of the outer molds 11 and 12. The horizontally support member 30 can not provide the opening 41 with a peripheral wall perpendicular to the inclined front face but, instead, with a peripheral wall oblique to the inclined front face.

Being the same as the wax pattern 40, any sequent golf club head obtained from the pattern 40 will have an opening 41 delimited by a peripheral wall oblique to the inclined front face of the pattern 40. As a necessary striking plate is placed on such a golf club head within the opening 41 during a subsequent welding procedure, a broad gap appears and leads to a less acceptable welding result, particularly when the procedure is performed with a high-energy weld, such as laser welding, plasma arc welding and the like.

OBJECTS OF THE INVENTION

The object of the present invention is to provide a mold assembly in which a tunnel defined in outer molds of the mold assembly makes such a compensatory angle with horizontal surfaces of the outer molds that a resulting wax pattern may have an opening delimited by a peripheral wall perpendicular to a front face of the wax pattern, so as to improve wedding quality for any sequent golf club head obtained from the wax pattern.

SUMMARY OF THE INVENTION

To achieve the aforementioned objects, the present invention provides a mold assembly comprising a plurality of outer molds coupled together to defined a cavity and a tunnel therein, with a plurality of mold cores received in the cavity and a supporting member received in the tunnel, in order to form a wax pattern that has an opening formed in a front face thereof. Furthermore, both the tunnel and a parting plane between the mold cores make such a compensatory angle with horizontal surfaces of the outer molds that a resulting wax pattern may have an opening delimited by a peripheral wall perpendicular to the front face of the wax pattern.

Other objects, advantages and novel features of this invention will become more apparent from the following detailed description when taken in conjunction with the accompanying drawings.

DETAILED DESCRIPTION OF THE PREFERRED EMBODIMENT

The present invention is now to be described hereinafter in detail, in which the same referential numerals are used for the same parts as those in the prior art.

Figure 1:
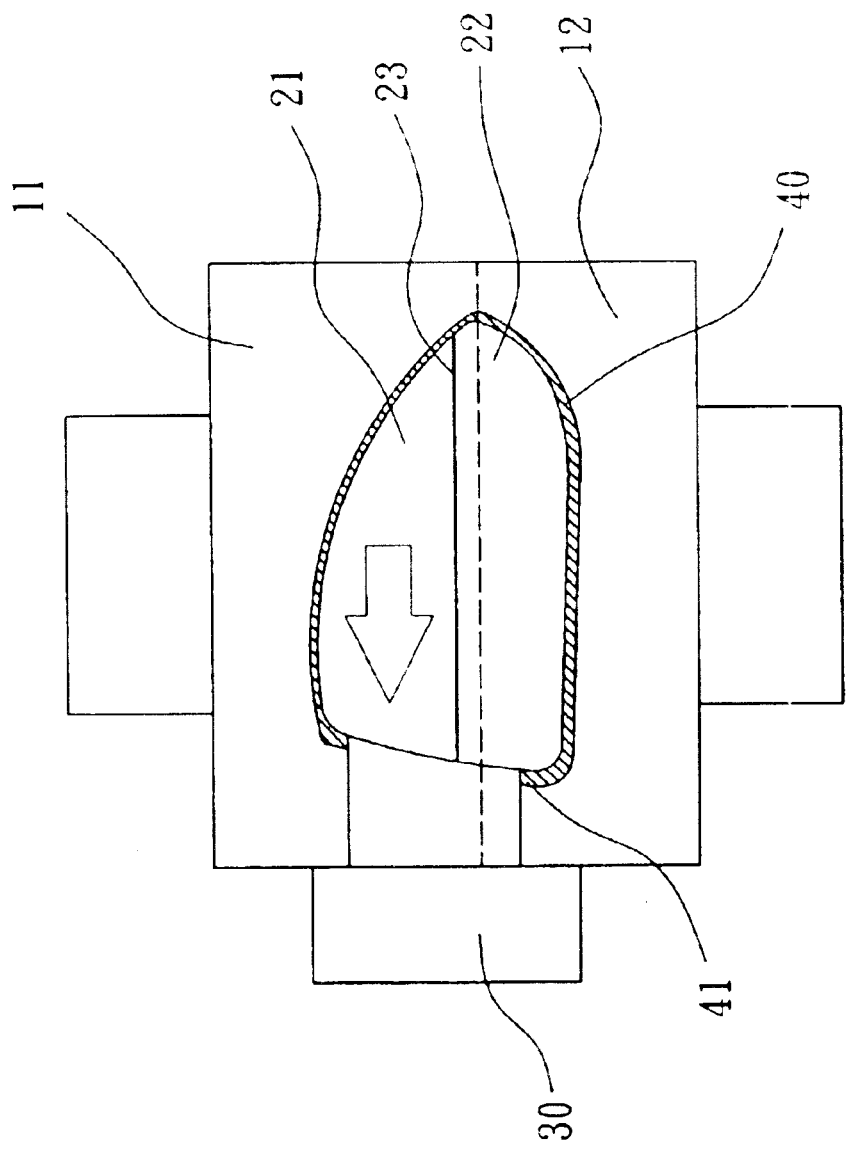
FIG. 1 is a sectional view of a conventional mold assembly for forming a wax pattern in the shaped of a golf club head.
Figure 2:
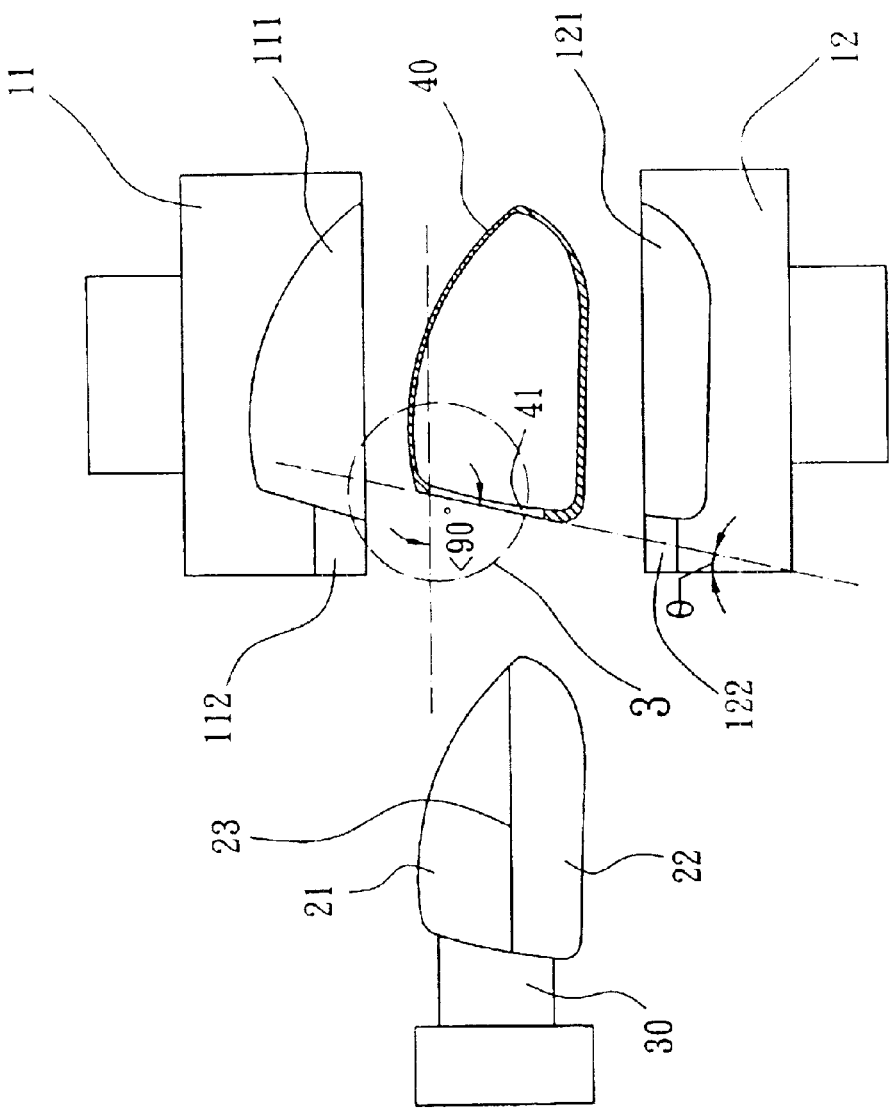
FIG. 2 is an exploded sectional view of the conventional mold assembly of FIG. 1.
Figure 3:
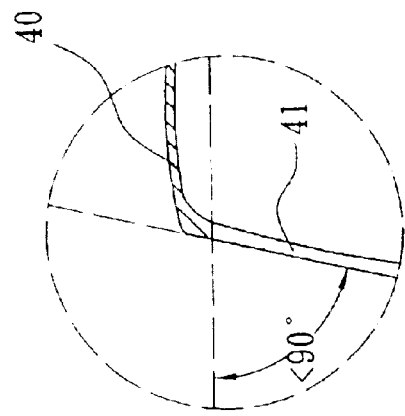
FIG. 3 is an enlarged, broken-out sectional view of a wax pattern obtained from the mold assembly of FIG. 1.
Figure 4:
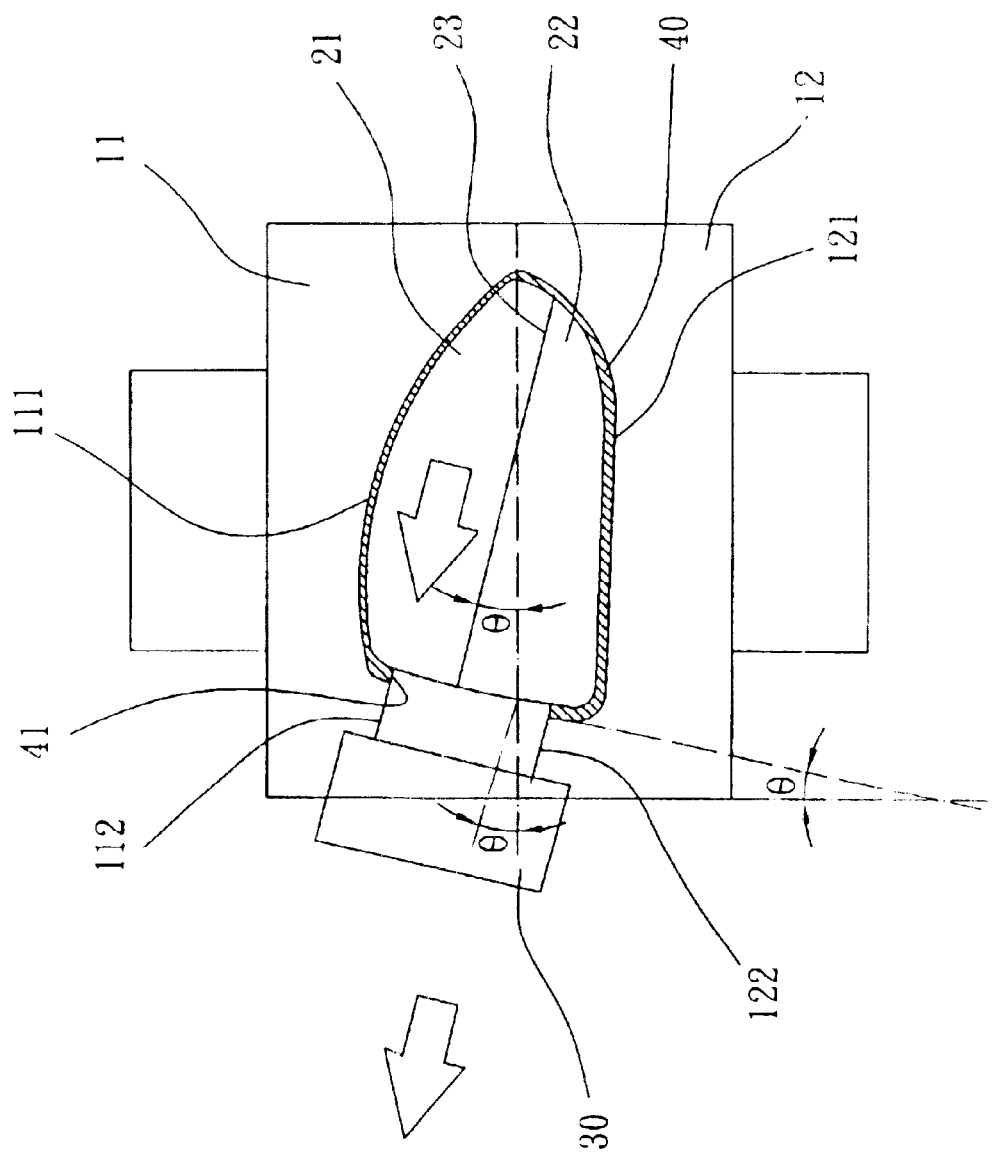
FIG. 4 is a sectional view of a preferred embodiment of a mold assembly in accordance with the present invention for forming a wax pattern in the shaped of a golf club head.

Referring to FIG. 4, there is shown a preferred embodiment of a mold assembly in accordance with the present invention for forming a wax pattern 40 in the shape of a golf club head. The mold assembly includes a pair of outer molds 11 and 12 releasably coupled together to define a cavity 111 and 121 and an inclined tunnel 112 and 122 therein, with a plurality of mold cores 21 and 22 received in the cavity 111 and 121 and a supporting member 30 received in the inclined tunnel 112 and 122, in order to form a wax pattern 40 which has an opening 41 formed in an inclined front face thereof.

The inclined tunnel 112 and 122, as well as a parting plane 23 between the mold cores 21 and 22, makes a compensatory angle with horizontal surfaces of the outer molds 11 and 12. This allows peripheral wall of the opening 41 to be perpendicular to the inclined front face of the wax pattern 40 without making any trouble in pulling out the mold cores 21 and 22 and the supporting member 30. Therefore, wedding quality may be improved during a subsequent process for manufacturing any sequent golf club head obtainable from the wax pattern 40.

Figure 5:
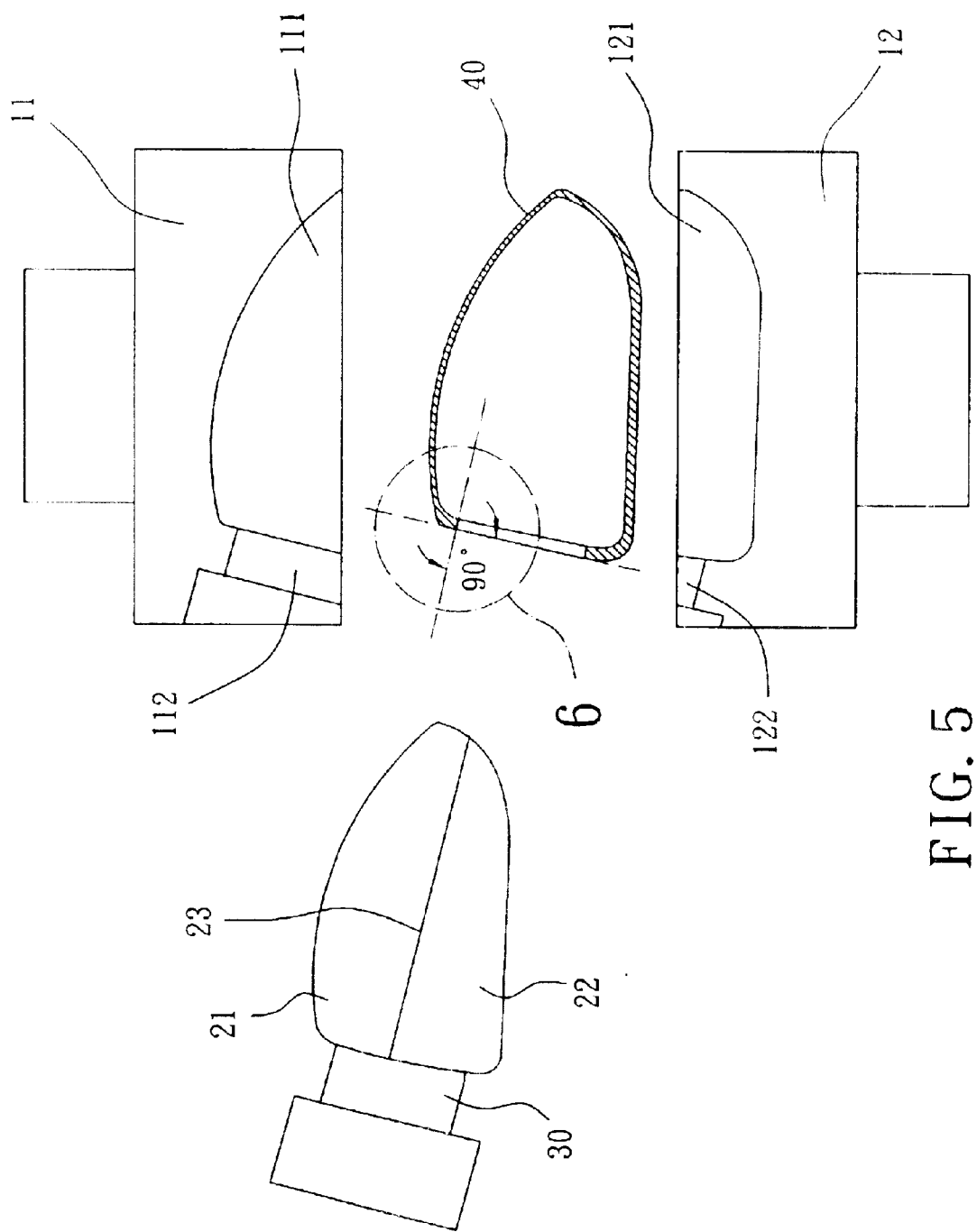
FIG. 5 is an exploded sectional view of the inventive mold assembly of FIG. 4.
Figure 6:
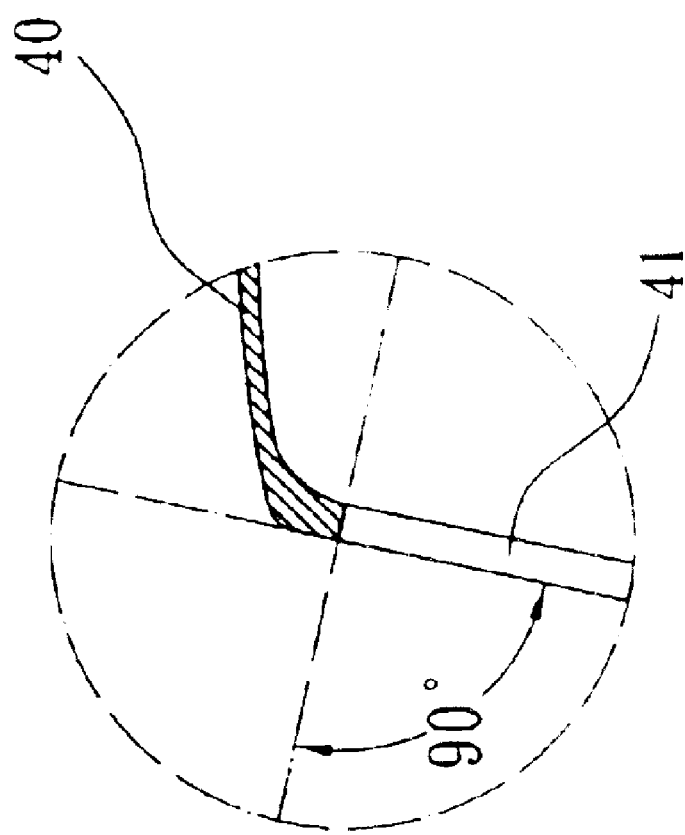
FIG. 6 is an enlarged, broken-out sectional view of a wax pattern obtained from the inventive mold assembly of FIG. 4.

Referring again to FIG. 4 and additionally to FIGS. 5 and 6, details of the inventive mold assembly are shown. The cavity 111 and 121 in the same shape of the golf club head has a bottom substantially parallel to the horizontal surfaces of the outer molds 11 and 12 and has an inclined inner wall corresponding to the inclined front face of the wax pattern 40. The inclined inner wall, as well as the front face of the wax pattern 40, makes an angle θ with vertical surfaces of the outer modes 11 and 12, as clearly shown in FIG. 4.

In the inventive mold assembly, the inclined tunnel 112 and 122 is deviated from the horizontal surfaces of the outer modes 11 and 12 by a compensatory angle, preferably of the same degrees as the above-mentioned angle θ. The inclination of the tunnel 112 and 122 makes the supporting member 30 perpendicular to the inclined front face of the wax pattern 40, and so the peripheral wall of the opening 41 of the pattern 40 is also perpendicular to the inclined front face, as best shown in FIG. 6. The wax pattern 40 with such an opening 41 is beneficial to any sequent golf club head, to which a striking plate may be welded without unacceptably broad wedding steam.

Preferably, the mold cores 22 may have at least one parting plane 23 making an angle of the same degrees as the compensatory angel θ with the horizontal surfaces of the outer molds 11 and 12. This allows the mode cores 21 and 22, as well as the supporting member 30, to be pulled out easily when the resulting was pattern 40 is intended to be removed from the mold assembly.

In an alternative embodiment, the releasably coupled outer molds 11 and 12 may define therein a cavity 111 and 121 which now has a bottom at a compensatory angle θ with horizontal surfaces of the outer molds 11 and 12, to be precisely, at a compensatory angle θ complementary to an angle between the inclined front face and the underside of the wax pattern 40, whereas both the tunnel 112 and 122 and the parting plane 23 between the accordingly inclined mold cores 21 and 22 remain horizontal.

Such inclination of the cavity 111 and 121 also makes the supporting member 30 to be perpendicular to the front face of the wax pattern 40, and so the peripheral wall of the opening 41 of the pattern 40 is perpendicular to the front face of the pattern 40, as clearly shown in FIG. 6. This is also beneficial to the sequent golf club head in its wedding quality.

From the foregoing, it is apparent that this invention has the advantage of providing the opening of the wax pattern with a peripheral wall which is perpendicular to the front face of the wax pattern. In comparison to the prior art, the present invention improve the wedding quality during a subsequent process for manufacturing an associated golf club head.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A mold assembly for forming a wax pattern in the shape of a golf club head, comprising:

a plurality of outer molds releasably coupled together to define a cavity and an inclined tunnel therein, said cavity has a bottom substantially parallel to horizontal surfaces of said outer molds, said inclined tunnel making a compensatory angle with said horizontal surfaces of said outer molds;

a plurality of mold cores received in said cavity of said outer molds for forming, together with said outer molds, said wax pattern in the shape of said golf club head; and a supporting member received in said inclined tunnel of said outer molds for holding said mold cores in said cavity and forming an opening in a front face of said wax pattern;

whereby said opening of said wax pattern may be delimited by a peripheral wall substantially perpendicular to said front face of said wax pattern.

2. The mold assembly as claimed in claim 1, wherein said compensatory angle is equal to an angle between said inclined front face of said wax pattern and vertical surfaces of said outer modes.

3. The mold assembly as claimed in claim 1, wherein said mold cores have at least one parting plane therebetween, and wherein said parting plane make an angle of the same degrees as said compensatory angle with said horizontal surfaces of said outer molds.

4. A mold assembly for forming a wax pattern in the shape of a golf club head, comprising:

a plurality of outer molds releasably coupled together to define an inclined cavity and a tunnel therein, said tunnel being substantially parallel to horizontal surfaces of said outer molds, said inclined cavity has a bottom making a compensatory angle with said horizontal surfaces of said outer molds;

a plurality of mold cores received in said inclined cavity of said outer molds for forming, together with said outer molds, said wax pattern in the shape of said golf club head; and a supporting member received in said tunnel of said outer molds for holding said mold cores in said cavity and forming an opening in a front face of said wax pattern;

whereby said opening of said wax pattern may be delimited by a peripheral wall substantially perpendicular to said front face of said wax pattern.

5. The mold assembly as claimed in claim 4, wherein said compensatory angle is complementary to an angle between said inclined front face and an underside of said wax pattern.

6. The mold assembly as claimed in claim 4, wherein said mold cores have at least one parting plane therebetween, and wherein said parting plane is substantially parallel to said horizontal surfaces of said outer molds.

* * * * *